United States Patent [19]

Hornsby

[11] Patent Number: 5,430,797
[45] Date of Patent: Jul. 4, 1995

[54] COIN RETURN COVER

[75] Inventor: Michael H. Hornsby, Havana, Fla.

[73] Assignee: Protel, Inc., Lakeland, Fla.

[21] Appl. No.: 139,504

[22] Filed: Oct. 19, 1993

[51] Int. Cl.[6] ............... H04M 1/00; H04M 17/00
[52] U.S. Cl. ......................... 379/451; 379/437;
       379/143; 379/144; 379/145; 379/453
[58] Field of Search ............... 379/451, 437, 145, 143,
       379/453, 144; 232/50, 43.1, 57.5, 58; 194/202,
       351

[56] References Cited

U.S. PATENT DOCUMENTS 3,868,483  2/1975  Trimmer et al. ............... 379/143
5,146,492  9/1992  Stone et al. ................. 379/145

Primary Examiner—James L. Dwyer
Assistant Examiner—Jack Chiang
Attorney, Agent, or Firm—Kilpatrick & Cody

[57] ABSTRACT

Pay telephone coin opening cover assemblies which include portions of the pay telephone and a mask fashioned to cover the coin return opening. The mask includes a structural element or elements which cooperate with coin return opening structure and existing interior portions of the pay telephone structure to secure against the opening a face plate which is attractive and unobtrusive in appearance. The invention allows a conventional pay telephone to be recycled into a coinless pay telephone which is attractive in appearance, friendly to the user, and cost competitive.

21 Claims, 3 Drawing Sheets

COIN RETURN COVER

The present invention relates to structures which may be used to provide an attractive, durable, inexpensive and easily installed cover for coin return openings of pay telephones whose coin deposit and return components have been removed.

BACKGROUND OF THE INVENTION

Designs for coin-operated pay telephones typically feature one or more coin slots at the top of the telephone and a coin return door generally located directly below the slots. The coin return lever is generally located immediately below the coin slots. In GTE-style telephones, for instance, the slot, coin return door and mechanism are located on the right when facing the telephone, while on Western Electric (WECO)-style telephones, these are found on the left.

In recent years, after deregulation of the telephone industry, a market has been created for business owners and others who wish to own their own pay telephones rather than continuing to participate in profits from telephones placed on premises by the telephone company. This coin-operated, customer-owned telephone ("COCOT") industry features stiff competition among a number of entrants, and is very price competitive.

With the advent of the integrated circuit, it has additionally been possible to incorporate intelligent features into pay telephones. Accordingly, such telephones at present may contain microcircuits which store telephone rating information that allows the telephone to calculate rates for calls, collect appropriate coinage or interact with credit cards, and initiate, control and terminate local and long distance connections. As the telephones becomes more intelligent, the industry has noted a significant decrease in the number of calls controlled by coins rather than credit cards.

These factors have generated a market for pay telephones which do not include coin mechanisms, with or without intelligent features.

SUMMARY OF THE INVENTION

The present invention features a component which may be used in converting traditional coin-operated telephones into coinless pay telephones. A large base of currently existing coin-operated telephones may consequently be recycled into coinless telephones that are attractive in appearance and cost competitive. These converted telephones also enjoy the longstanding familiarity of a large customer base who are less intimidated by telephones having a traditional appearance than newer versions of intelligent telephones which feature VDT displays, numerous buttons other than the keypad, and other design and functional elements, many of which are beyond the needs or ken of many traditional pay telephone customers.

Components of the present invention function as covers for coin return openings in coin-operated pay telephones. During conversion, the coin return mechanism is removed from such a telephone which leaves a void behind the coin return opening. The void typically features a roof which structurally separates the coin return opening and the coin box, in reinforced fashion, from the electronics of the telephone. The roof in turn typically contains a set screw which penetrates downwardly into the coin return opening void and which is traditionally employed to assist in retaining the coin return mechanism in place.

The present invention utilizes this set screw, a portion of the coin return opening lip and, if desired, other features of the coin return opening to secure a face plate into place that covers the coin return opening in an attractive and unobtrusive fashion.

According to a preferred embodiment of the invention, such a component features a face plate, from the non-exposed side of which projects a latch that cooperates with the coin return opening, and a strut against which the set screw acts (when rotated properly) to retain the face plate in place in a reinforced manner that minimizes unauthorized access to the interior of the telephone through the coin opening.

It is accordingly an object of the present invention to provide a component which may be used to convert a coin-operated pay telephone into a coinless pay telephone that is attractive, friendly to the user, competitively priced, and that allows existing pay telephones to be recycled.

It is an additional object of the present invention to provide a coin return opening cover that lends an attractive appearance to the pay telephone, that may be manufactured and installed at a reasonable cost, and with a minimum of effort, and that is structurally sound to minimize unauthorized access to the interior of the pay telephone.

Other objects, features and advantages of the invention are apparent with respect to the remainder of this document.

DETAILED DESCRIPTION OF THE DRAWINGS

Figure 1:
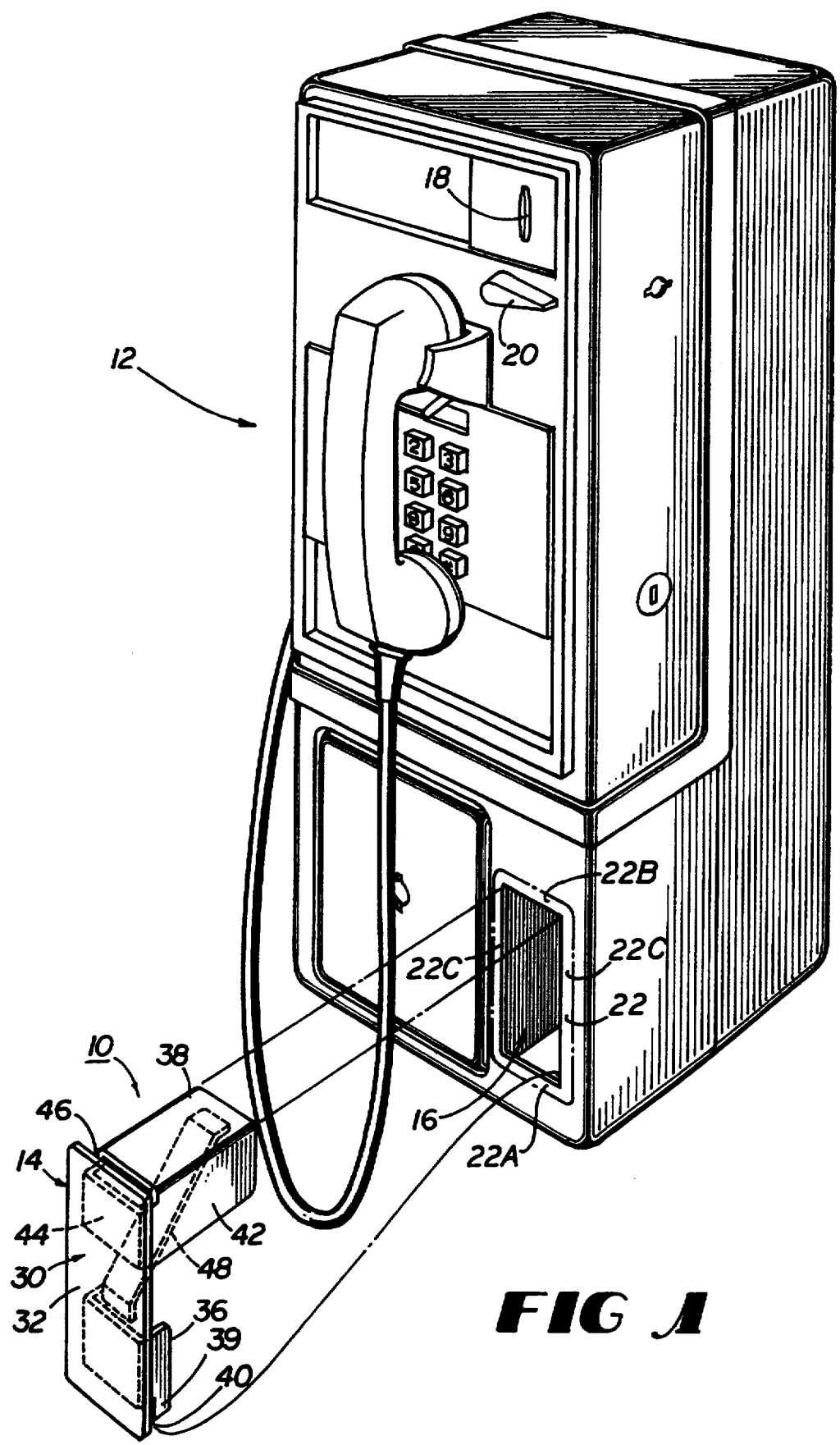
FIG. 1 shows portions of a preferred embodiment of a telephone coin return cover assembly according to the present invention, including portions of a pay telephone and a mask of the present invention.

FIG. 1 is a perspective view of a coin return cover assembly 10 which includes portions of a coin-operated pay telephone 12 and a mask 14.

Figure 2:
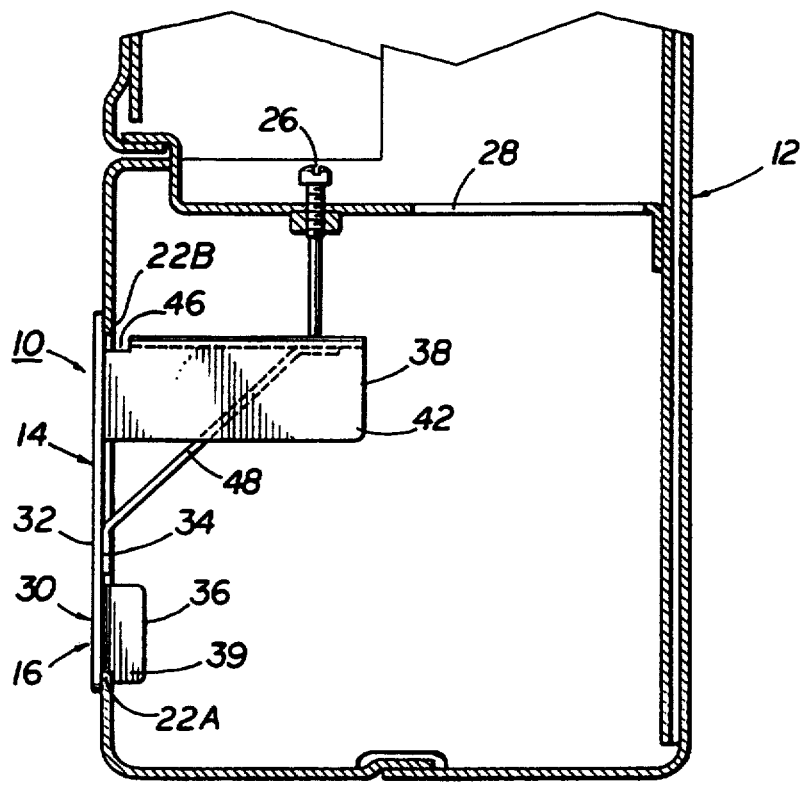
FIG. 2 is a left side elevational cross section view of the mask of FIG. 1 in place to form the telephone coin return cover assembly of FIG. 1.
Figure 3:
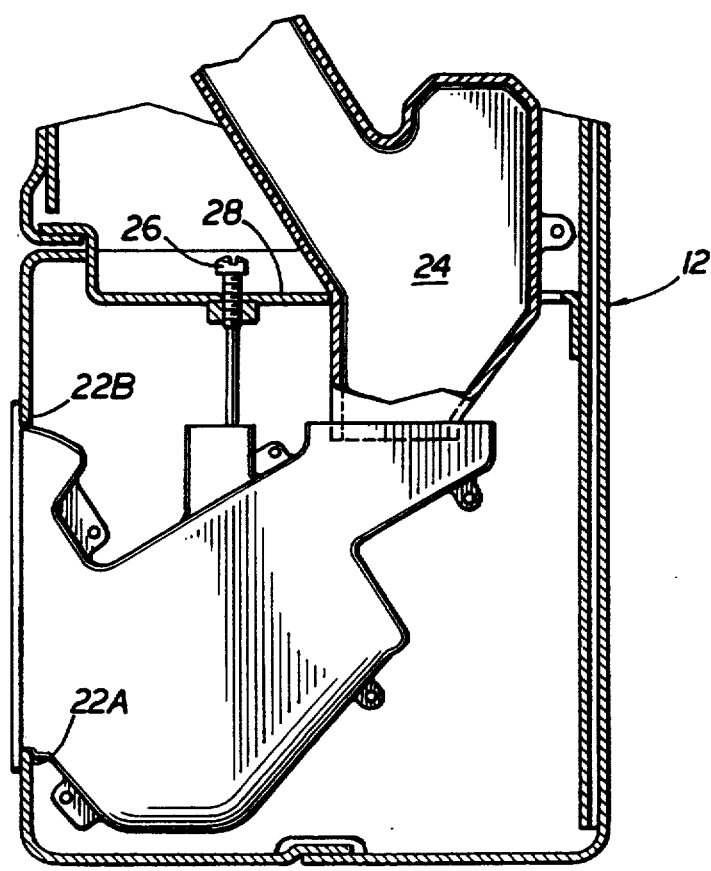
FIG. 3 is a left side elevational cross section view showing the pay telephone of FIG. 1 which contains a coin return mechanism rather than the mask of FIG. 1.
Figure 4:
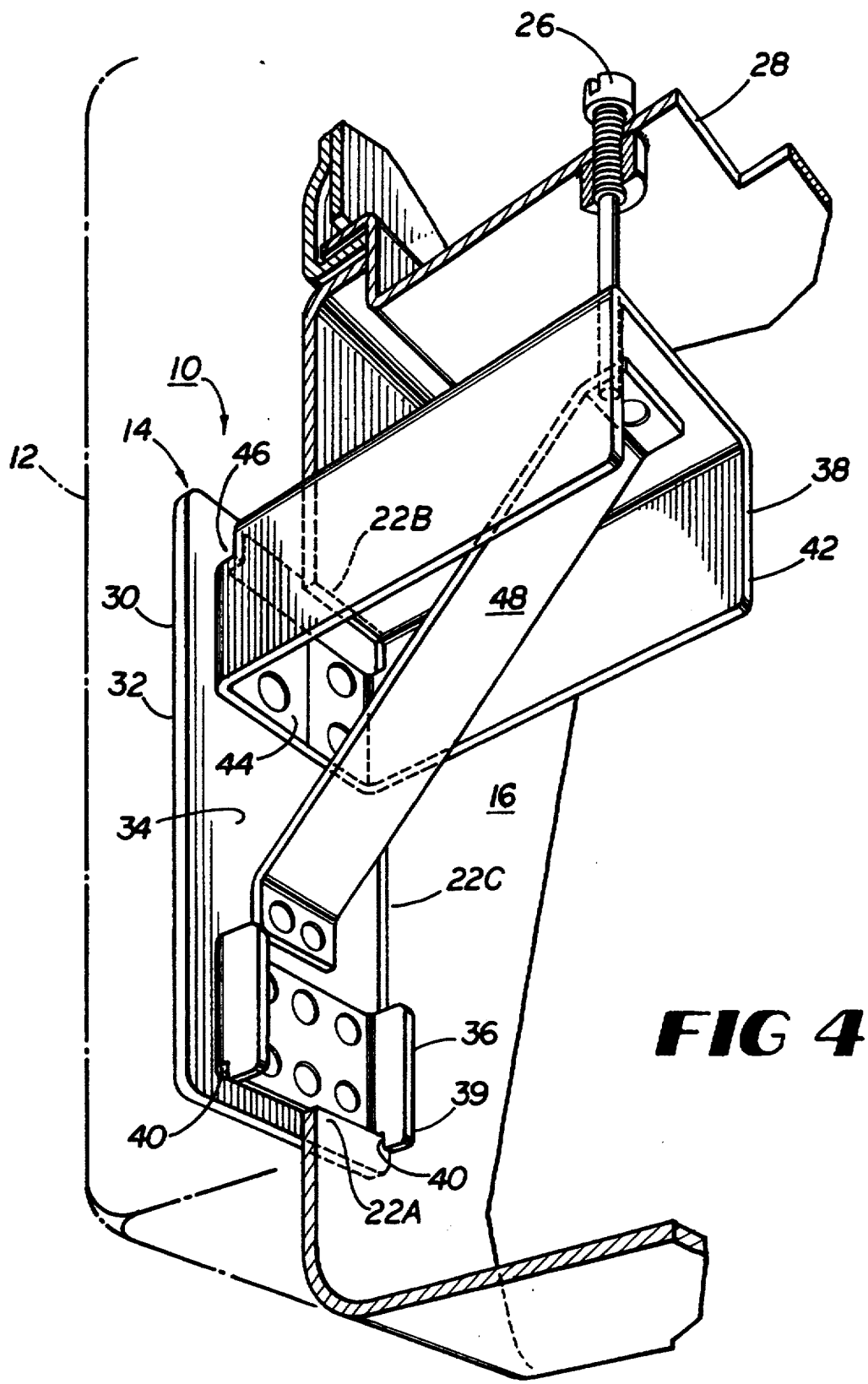
FIG. 4 is a perspective view of portions of the telephone coin return cover assembly of FIG. 1, shown in partial cross section.

Pay telephone 12, which may be converted using a mask 14 according to the present invention, may be of a conventional Western Electric design having coin slots, coin return opening and return lever on the left, of GTE design having these features on the right as one faces the telephone 12, or of any other design in which a coin return opening 16 is provided. Coin return opening 16 as shown in FIG. 1 comprises several lips 22: lower lip 22A, upper lip 22B, and side lips 22C. In a conventional coin-operated pay telephone, such lips act as flanges for the facing of the coin return mechanism 24, portions of which are shown in FIG. 3. Moreover, a set screw 26 or other appropriate retaining device penetrates the space into the opening 16 from a reinforced coin compartment roof 28 as shown in FIGS. 2, 3, and 4. Set screw 26 assists in retaining coin return mechanism 24 in place, as the mechanism 24 cooperates with lips 22.

Mask 30 takes advantage of this existing structure to provide an attractive, strong, easily installed and inexpensive cover for opening 16. Mask 30 includes a face plate 32 as shown in FIGS. 1, 2, and 4 which may be, but need not be, rectangularly shaped to conform generally to the shape of coin return opening 16 with overlap of lips 22 as desired. Face plate 32 may be made of stainless steel or other appropriate material as desired. Projecting from the reverse (nonexposed) side 34 of face plate 32 is a securing means. The securing means may be formed of a single structural unit, or of two or more structural units. In FIGS. 1, 2, and 4, for instance, securing means includes a first member 36 which cooperates with a lip 22 of opening 16, and a second member 38 against which set screw 26 acts to secure mask 30 in place against opening 16.

First member 36 of mask 30, according to the preferred embodiment shown in FIG. 1, may be generally U-shaped in cross section when viewed lengthwise of mask 30. According to the preferred embodiment shown in the drawings, the U-shaped first member 36 is in the form of a latch 39 which contains recesses 40 that catch lower lip 22A of opening 16. These recesses 40 and such cooperation with lower lip 22A are shown perhaps most clearly in FIGS. 2 and 4. First member 36 may be of any desired structure or configuration, however, and may cooperate with lower lip 22A or any other lip or lips of opening 16 not only using recesses such as recesses 40, but any other desired means for securing one component against another. In the preferred embodiment, first member 36 is welded to reverse side 34 of face plate 32, and thus is directly attached to face plate 32. First member 36 may be attached to other structure interposed between it and face plate 32 (physically or conceptually), and thus "connected" rather than being directly attached to face plate 32.

Second member 38 of the preferred embodiment shown in FIGS. 1, 2 and 4 of the present invention includes a strut 42 which features a generally U-shaped cross section when viewed perpendicular to the face plate 32. In the preferred embodiment, strut 32 includes an end face 44 oriented perpendicular to the U-shaped cross section, which end face 44 is directly attached to reverse side 34 of face plate 32 by welding. Strut 42 may be of any desired configuration and structure, however, to receive the force of set screw 26 in order to secure face plate 32 in place against opening 16 and effectively transfer that force to the face plate 32. Second member 38 may be directly attached to face plate 32 as shown in FIGS. 1, 2, and 4, or it may be connected via intervening structure or as otherwise desired (as is the case with first member 36). Second member 38 may, as shown in FIGS. 1, 2, and 4, project substantially perpendicularly from face plate 32 (as may first member 36 as shown in those figures), but it may just as easily project from face plate 32 in any other orientation (once again as may first member 36).

As shown perhaps most clearly in FIGS. 2 and 4, second member 38 may contain a detent 46 formed to allow mask 30 to be inserted properly in coin return opening 16. Thus, if a robust second member structure 38 such as strut 42 is employed as shown in those figures, second member 38 may be inserted into opening 16 first until face plate 32 is generally in the vicinity of lips 22 of opening 16. Then, the mask 30 may be slid (as in an upward fashion as shown in FIG. 2) so that lips 22 protrude into detent 46 of second member 38 in order to allow first member 36 to be rotated into opening 16. The mask 30 may then be slid as appropriate to allow cooperation of first member 36 with lip or lips 22 and set screw 26 to be rotated in place in order to secure mask 30 and face plate 32 against opening 16.

Robustness of the structure of mask 30 may be aided by including a brace 48 such as the brace shown in FIGS. 1, 2, and 4. The brace 48 relieves a portion of the potentially tremendous bending moment imposed upon the face plate 32/second member 38 attachment or connection by set screw 26 and the tool of a person attempting to pry face plate 32 off of coin return opening 16 (even if acting out of ignorance that the telephone no longer contains coins). Brace 48 may be welded or otherwise directly attached or connected to various components of mask 30 for this purpose.

The preferred embodiment thus in essence adds structure to the reverse side of a coin return opening face plate, in order to allow the face plate to be secured against the opening by cooperation with one or more lips of the opening and structure within the telephone which is conventionally used to retain the coin return mechanism in place. Alternative structure may be employed to that end, or to achieve the objects or advantages of the invention, without departing from the scope or spirit of the invention.

What is claimed is:

1. A telephone coin return cover assembly for converting a coinless telephone from a coin-operated telephone having a housing defining a lower lip and a coin return opening from which a coin return mechanism has been removed and into which a set screw projects, the assembly comprising:

(a) a mask which includes a face plate for completely covering the opening, a latch connected to the face plate which cooperates with the lower lip, and a strut having an end face connected to the face plate against which the set screw impinges to hold the mask in place, and (b) the strut including a detent which allows the mask to be inserted into the coin return opening properly.

2. A telephone coin return cover assembly according to claim 1 in which the latch and the strut are portions of the same structural unit.

3. A telephone coin return cover assembly according to claim 1 in which the latch is a first structural unit and the strut is a second structural unit.

4. A telephone coin return cover assembly according to claim 1 in which the latch is attached directly to the face plate.

5. A telephone coin return cover assembly according to claim 2 in which the strut is attached directly to the face plate.

6. A telephone coin return cover assembly according to claim 2 in which the strut projects substantially perpendicularly from the face plate.

7. A telephone coin return cover assembly according to claim 2 further comprising a brace which is attached to the strut and to the face plate.

8. A telephone coin return mask for completely masking the coin return opening in a pay telephone from which a coin return mechanism has been removed, wherein the opening includes a lip and a set screw, the mask comprising a face plate sized to cover the opening, a first member which is adapted to cooperate with the lip in order to connect the face plate to the lip, and a second member, connected to the face plate against which the set screw impinges to hold the mask in place, and the second member defines a detent with a gap for allowing the mask to slide and thereby allow the first member to cooperate with the lip.

9. A telephone coin return mask according to claim 8 in which the first member includes a latch connected to the face plate for cooperation with the lip, and the second member includes a strut connected to the face plate.

10. A telephone coin return mask according to claim 9 in which the latch and the strut are both attached directly to the face plate.

11. A telephone coin return mask according to claim 9 further including a brace attached to the face plate and the strut.

12. A telephone coin return mask according to claim 8 in which the first member and the second member are portions of the same structural unit.

13. A coinless telephone from a conventional coin-operated telephone having a housing which has a retaining device and a coin return opening from which a coin return mechanism is removed in order to form a lip, the telephone comprising:
  (a) the handset, hook and keypad each mounted on a housing, the housing defining an interior and equipped with the coin return opening that defines the lip;
  (b) a mask for covering the coin return opening in order to prevent access into the interior of the housing, the mask comprising:
    i. a face plate having a top section and a bottom section and sized to cover completely the coin return opening;
    ii. first securing means, connected to the bottom section of the face plate, for cooperation with the lip in order to maintain the bottom of the face plate within the housing; and
    iii. second securing means, connected to the top section of the face plate, the second securing means providing a surface against the retaining device, the second securing means projecting into the interior in order to force the face plate against the opening and thereby maintain the mask in place; and
  (c) a brace that is connected to and acts against the face plate and the second securing means.

14. A coinless telephone according to claim 13 in which the retaining device is a set screw.

15. A coinless telephone according to claim 13 in which the first securing means is attached directly to the face plate.

16. A coinless telephone according to claim 13 in which the face plate is formed of stainless steel.

17. A coinless telephone according to claim 13 further comprising means, associated with the second securing means, for allowing the mask to be inserted into the coin return opening properly.

18. A coinless telephone according to claim 17 in which the insertion means comprises a detent forming a gap to thereby allow the mask to slide upward so that the first securing means is rotated into place over the lip, and the mask then slid downward so that the first securing means cooperates with the lip.

19. Apparatus for making a coinless telephone from a conventional coin-operated telephone having a housing which has retaining device and a coin return opening from which a coin return mechanism is removed in order to form a first and second lip, the apparatus comprising:
  (a) a face plate, sized to cover completely the coin return opening, and defining a first end, a second end and a reverse side;
  (b) a first member, attached to the reverse side adjacent the first end of the face plate, comprising a latch which engages the first lip;
  (c) a second member, attached to the reverse side adjacent the second end of the face plate, comprising
    i. a strut which has an end face attached to the face plate, the strut cooperates with the retaining device; and
    ii. a detent defining a gap for allowing the second member to slide so that the second lip protrudes into the gap,
  (d) thereby allowing the first member to engage the first lip so that, upon adjustment of the retaining device, the reverse side contacts the first and second lips and the face plate is held firmly against the housing to cover completely the coin return opening.

20. Apparatus according to claim 19 further comprising a brace that is connected to the face plate and the second member in order to relieve a removing force exerted upon the face plate.

21. Apparatus according to claim 19 in which the latch comprises a u-shaped bracket that is attached to the reverse side of the face plate and thereby forms a recess for engaging the first lip.

* * * * *

UNITED STATES PATENT AND TRADEMARK OFFICE
CERTIFICATE OF CORRECTION

PATENT NO. : 5,430,797
DATED : July 4, 1995
INVENTOR(S) : Michael H. Hornsby, Havana, Florida It is certified that error appears in the above-indentified patent and that said Letters Patent is hereby corrected as shown below:

Column 5, line 41,
Claim 13, line 41, "iii", delete -- , --

Column 6, line 18,
Claim 19, line 18, after "has" insert -- a --

Signed and Sealed this

Twenty-sixth Day of November 1996

Attest:

BRUCE LEHMAN

Attesting Officer    Commissioner of Patents and Trademarks